US006622243B1

(12) United States Patent
Christeson

(10) Patent No.: US 6,622,243 B1
(45) Date of Patent: Sep. 16, 2003

(54) METHOD FOR SECURING CMOS CONFIGURATION INFORMATION IN NON-VOLATILE MEMORY

(75) Inventor: Orville H. Christeson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/444,225

(22) Filed: Nov. 19, 1999

(51) Int. Cl.$^7$ ................................. G06F 9/24
(52) U.S. Cl. ............... 713/1; 713/1; 713/100; 711/104; 711/135; 711/118
(58) Field of Search .............. 713/1, 100; 711/104, 711/135, 118

(56) References Cited

U.S. PATENT DOCUMENTS

| | | | | |
|---|---|---|---|---|
| 4,845,632 A | * | 7/1989 | Kroll et al. | 364/464.02 |
| 4,916,605 A | * | 4/1990 | Beardsley et al. | 364/200 |
| 5,519,843 A | * | 5/1996 | Moran et al. | 395/430 |
| 5,542,077 A | * | 7/1996 | Johnson et al. | 395/750 |
| 5,579,522 A | | 11/1996 | Christeson et al. | |
| 5,781,793 A | * | 7/1998 | Larvoire et al. | 395/800.37 |
| 5,822,581 A | * | 10/1998 | Chirsteson | 395/651 |
| 5,938,764 A | * | 8/1999 | Klein | 713/1 |
| 5,956,749 A | * | 9/1999 | Kakihara | 711/162 |
| 5,961,611 A | * | 10/1999 | Oh | 710/1 |
| 6,263,398 B1 | * | 7/2001 | Taylor et al. | 711/3 |
| 6,289,459 B1 | * | 9/2001 | Fischer et al. | 713/200 |
| 6,356,965 B1 | * | 3/2002 | Broyles et al. | 710/104 |

FOREIGN PATENT DOCUMENTS

| | | | | |
|---|---|---|---|---|
| JP | 407191910 A | * | 7/1995 | |
| JP | 408328963 A | * | 12/1999 | G06F/12/16 |

* cited by examiner

Primary Examiner—Thomas Lee
Assistant Examiner—Nitin C. Patel
(74) Attorney, Agent, or Firm—Mark V. Seeley

(57) ABSTRACT

A system and method for securing configuration information for a computer system. The method comprises saving configuration information in CMOS memory and automatically programming that configuration information into a non-volatile memory. The system includes a processor, a CMOS memory, and a flash memory. The system also includes a computer-readable medium having computer-executable instructions stored therein for causing configuration information, when saved to the CMOS memory, to be automatically programmed into the flash memory and for causing configuration information stored in the flash memory to be automatically retrieved from the flash memory and written into the CMOS memory every time the computer system is powered on or reset.

3 Claims, 1 Drawing Sheet

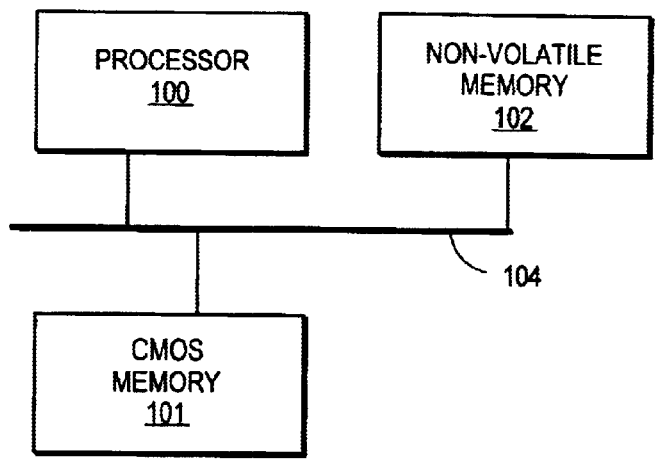
FIG. 1
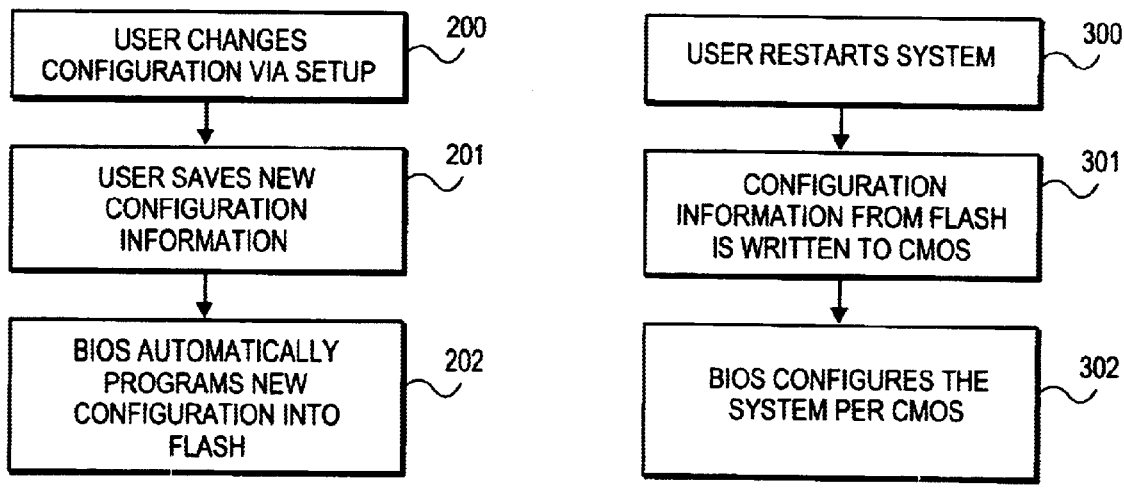
FIG. 2
FIG. 3

METHOD FOR SECURING CMOS CONFIGURATION INFORMATION IN NON-VOLATILE MEMORY

FIELD OF THE INVENTION

The present invention relates to computer systems. More specifically, the invention relates to systems for storing configuration information in a tamper resistant manner.

BACKGROUND OF THE INVENTION

Each of Intel's Pentium® III processors stores a value, which is intended to be statistically unique for a given processor, that is analogous to its "fingerprint." That statistically unique value can be said to constitute a processor serial number ("PSN") for a given processor. Invoking the CPUID instruction enables access to the PSN by loading the PSN into a general purpose register that is visible to a programmer, who may use that value for any desired purpose.

Because of this processor identifier, a remote server may identify a particular Pentium® III processor containing system by simply accessing that value. Such a feature may enable such a server to grant access to certain confidential information to authorized systems only. For example, a server that stores bank, brokerage, medical, or other confidential records, may permit access only to a remote system that has a particular PSN. When such a remote system requests access to a restricted account or record, the server can retrieve that system's PSN, then check it against a set of previously stored PSNs, which identify systems for which access is authorized. If the remote system's PSN does not match any of the stored PSNs, then access is denied.

Although the presence of a remotely accessible PSN on a given system may enable such a useful authentication function, the system user may not want to allow indiscriminate access to that number. Such access could, in theory, permit tracking of the user's web surfing activity, which the user may not desire. One proposal for enabling a user to choose whether to permit or prohibit access to a system's PSN is to provide a setup option that allows the user to activate or disable PSN access. The user's selection is recorded as an "on" or "off" state for a bit stored in CMOS memory.

For some users, however, such a mechanism for providing user control over access to the PSN may not be deemed adequate. A malicious intruder having access to the system could locate the bit in CMOS that controls the PSN disable function and program a change from the "off" state to the "on" state. Such a change will reactivate remote access to the PSN without the user's knowledge the next time the system is restarted.

Accordingly, there is a need for a method for securing CMOS configuration information. There is a need for such a method that makes it more difficult for an intruder to remotely alter CMOS settings, e.g., one disabling remote access to the PSN of a Pentium® III processor containing system.

SUMMARY OF THE INVENTION

A system and method for securing configuration information for a computer is disclosed. The method comprises saving configuration information in CMOS memory, and automatically programming that configuration information into a non-volatile memory at the same time it is saved into the CMOS memory. The configuration information is automatically programmed into the non-volatile memory in a user transparent manner without user action. The method of the present invention may further comprise storing configuration information in a non-volatile memory, and automatically writing the configuration information from the non-volatile memory to a CMOS memory every time the computer system is powered on or reset, in a user transparent manner without user action.

The system includes a processor, a CMOS memory, and a non-volatile memory. That memory, preferably a flash memory, contains computer-executable instructions for causing configuration information, when saved to the CMOS memory, to be automatically programmed into the non-volatile memory and/or for causing configuration information to be automatically retrieved from the non-volatile memory and written into the CMOS memory every time the computer system is powered on or reset.

BRIEF DESCRIPTION OF THE DRAWINGS

FIG. 1 is a block diagram representing the computer hardware used by the system of the present invention.

FIG. 2 is a flow chart representing a first aspect of the method of the present invention.

FIG. 3 is a flow chart representing a second aspect of the method of the present invention.

DETAILED DESCRIPTION OF THE PRESENT INVENTION

The present invention is a system and method for securing configuration information for a computer. As shown in FIG. 1, the computer hardware employed by the system of the present invention includes processor 100, CMOS memory 101, and a non-volatile memory 102. These components communicate with each other over bus 104.

Processor 100 preferably is a Pentium® III processor manufactured by Intel Corporation, but may be a later generation Intel processor or other Intel Architecture compatible processor, a RISC processor, or other device capable of processing data and instructions. When processor 100 is a Pentium® III processor, the system containing it may be identified by the processor's PSN—accessible by invoking the CPUID instruction. CMOS memory 101 generally comprises a battery-backed random access memory ("RAM") for storing system configuration information.

Non-volatile memory 102 preferably is a flash memory. Such a device preserves stored information even when power is no longer supplied to it. Flash memory may be erased and reprogrammed using a dedicated set of electrical signals, as is well known to those skilled in the art. When non-volatile memory 102 comprises a flash memory, that device preferably is partitioned into separately erasable and programmable blocks. One of those blocks may store configuration information, e.g, a copy of certain configuration information which is also stored in CMOS memory 101—as is described in U.S. Pat. No. 5,822,581, which is assigned to this application's assignee.

In addition to configuration information, non-volatile memory 102 may store a basic input/output system ("BIOS"), which may include SETUP and Power-On-Self-Test ("POST") programs, as is well known to those skilled in the art. SETUP is a program that lets the user configure the computer in a desired manner, e.g., by specifying whether certain features are enabled or disabled, and by specifying certain preferences. POST is a program that tests and initializes various components, when the system is activated. Both the SETUP and POST programs are typically stored in one or more flash memory blocks that store the BIOS.

CMOS memory 101 will store system configuration information. Although a user may not care if some settings are tamper resistant, a user may not want others—such as those pertaining to system security or privacy—to be accessible by malicious programs. Such a program could, for example, clear out a system password, leaving the system unprotected.

Another example of a setting that a user may not want changed by an unauthorized source is the PSN "access disabled" setting. As mentioned above, when a computer system includes a Pentium® III processor, or other processor having an accessible PSN, a user may wish to disable access to that number. In many systems, a user may disable access by selecting the disable option in SETUP. When the user chooses to save this configuration change, when exiting SETUP, the exit and save routine included in the SETUP program modifies the contents of CMOS memory to record that change.

In a preferred embodiment of the present invention, that exit and save routine further includes computer-executable instructions, which cause that new configuration information to be automatically stored in non-volatile memory 102 at the same time it is written into CMOS memory. By adding such instructions to the exit and save routine, configuration information is automatically programmed into the non-volatile memory at the same time it is saved into the CMOS memory in a user transparent manner without user action.

When a system is manufactured, PSN access may be initially enabled or, alternatively, initially disabled by programming the CMOS memory, the flash memory, or both prior to shipping the system. That original state remains until the user specifically directs the system, via SETUP by means of a user interface (e.g., a keyboard or cursor control device, such as a mouse), to change it. For some systems, PSN access may be initially enabled, requiring the user to change the state to "access disabled" to protect the system from a remote system that attempts to access the PSN. For other systems, PSN access may be initially disabled, requiring the user to change the state from "access disabled" to "access enabled" before a remote system may access the PSN. After a user changes the CMOS state from one state to another, the user may, of course, change it back to the original state at any time via SETUP.

When a computer system, which incorporates the present invention, is initially powered on or reset, BIOS will configure it in accordance with the settings stored in CMOS. If a setting is subsequently changed via SETUP, that change will be automatically stored in the flash memory. Every time the computer is subsequently restarted, configuration information will be automatically written from the flash memory into the CMOS memory. If the configuration information is subsequently changed by a legitimate means such as SETUP, then that change will, of course, be duplicated in the flash memory, which will automatically write that new configuration information into the CMOS memory when the computer system is subsequently restarted.

An embodiment of a method for securing system configuration information using the system of the present invention is disclosed below, with reference to the FIGS. 2 and 3 flow charts. FIG. 2 illustrates the steps that occur when storing new configuration information in a relatively secure manner; whereas, FIG. 3 illustrates the steps that take place when enabling the system to be configured in accordance with that information during start up.

Initially, a user who desires to change the system configuration does so via SETUP (block 200). Those skilled in the art are familiar with the SETUP feature, and know how to use it to change a system's configuration. After changing the configuration in SETUP, the user may save that change in CMOS memory by selecting the exit and save option, when exiting SETUP (block 201). When the user makes such a change, the BIOS automatically programs the new configuration information into a non-volatile memory, such as a flash memory (block 202).

FIG. 3 illustrates what occurs when the system is powered on or reset. After a user restarts the system (block 300), configuration information is written from the non-volatile memory to the CMOS memory (block 301). Loading of the CMOS memory from the non-volatile memory can be performed by instructions added to the POST program, which are activated automatically each time the system is powered on or reset. By adding such instructions to POST, configuration information is automatically written from the non-volatile memory into the CMOS memory every time the computer is powered on or reset in a user transparent manner without user action. After the configuration information has been written into CMOS memory, the BIOS configures the system in accordance with it (block 302). (POST will reference the contents of CMOS memory, when the POST program is executed.) For example, if CMOS memory stores a PSN "access disabled" setting, the BIOS will instruct the processor to disable access to the PSN.

In the system of the present invention, non-volatile memory 102 stores computer-executable instructions that cause new configuration information (written to CMOS memory following a user initiated change in SETUP) to be automatically programmed into non-volatile memory 102. By storing new configuration information in non-volatile memory 102, relatively secure configuration information may be retrieved from memory 102 and written to CMOS memory 101 when the system is restarted. By storing configuration information in non-volatile memory, malicious programs must circumvent features built into such memory, if any, that are intended to prevent unauthorized access to stored information or unauthorized modification to it. In this regard, the degree to which the stored configuration information is made more secure depends upon the level of security that the non-volatile memory provides.

Although the foregoing description has specified a system and method for securing configuration information for a computer, those skilled in the art will appreciate that many modifications and substitutions may be made. For example, although the embodiments described above are presented in the context of making a PSN "access disabled" setting tamper resistant, the above described system and method may be applied to other configuration information that users do not want modified without their consent, such as, for example, a different type of system identifier or a password. Alternatively, the system and method of the present invention may be employed to store all configuration information in non-volatile memory automatically in a user transparent manner without user action. Accordingly, it is intended that all such modifications, alterations, substitutions and additions be considered to fall within the spirit and scope of the invention as defined by the appended claims.

What is claimed is:

1. A method for securing configuration information for a computer system comprising:

saving configuration information in CMOS memory, the configuration information disabling access to a processor serial number;

automatically programming that configuration information into a non-volatile memory at the same time it is saved into the CMOS memory; wherein the configuration information is automatically programmed into the non-volatile memory in a user transparent manner without user action; and automatically retrieving the configuration information from the non-volatile memory and writing the configuration information into the CMOS memory, every time the computer system is powered on or reset, in a user transparent manner without user action.

2. The method of claim 1 wherein the non-volatile memory is a flash memory.

3. The method of claim 2 wherein a BIOS routine programs the new configuration information into the flash memory.

* * * * *